Nov. 1, 1966

J. B. JONES ETAL 3,283,182

TRANSDUCER ASSEMBLY

Filed May 11, 1965

INVENTORS
JAMES BYRON JONES
NICHOLAS MAROPIS

BY

*Arthur H. Seidel*

ATTORNEY

Nov. 1, 1966  J. B. JONES ETAL  3,283,182
TRANSDUCER ASSEMBLY

Filed May 11, 1965  3 Sheets-Sheet 2

INVENTORS
JAMES BYRON JONES
NICHOLAS MAROPIS
BY

ATTORNEYS.

3,283,182
TRANSDUCER ASSEMBLY
James Byron Jones and Nicholas Maropis, both of West Chester, Pa., assignors to Aeroprojects Incorporated, West Chester, Pa., a corporation of Pennsylvania
Filed May 11, 1965, Ser. No. 456,900
20 Claims. (Cl. 310—8.7)

This invention relates to a transducer assembly, and more particularly to a transducer assembly incorporating electrostrictive transducers which may be pre-loaded in compression.

This application is a continuation-in-part of our co-pending application Serial No. 292,695 filed July 3, 1963 and entitled Transducer Assembly, now abandoned.

Mechanical vibrations may be produced in various ways, but the method generally employed in the acoustical vibration field involves conversion from electrical energy to acoustical energy by means of transducers of either the magnetostrictive or piezoelectric type. Magnetostrictive transducers (made of magnetostrictive or ferromagnetic materials such as nickel, nickel-iron alloy, iron-cobalt alloy, aluminum-iron alloy, etc.) have thus far been much more rugged and trouble-free than piezoelectric transducers, particularly in applications requiring the delivery of substantial amounts of power to the work. However, the piezoelectric transducers (sometimes called electrostrictive or ferroelectric transducers, and now generally made of ceramic materials such as barium titanate, lead-zirconate-titanate, etc., rather than the older quartz or other natural or commercial crystals) generally have a greater conversion efficiency—the newer ceramics sometimes having a conversion efficiency up to about three times that of a magnetostrictive transducer.

Highly desirable is a transducer which will: (a) have a high electromechanical conversion efficiency; (b) convert high levels of electrical power into high levels of vibratory power; (c) resist high stresses, both electrical and mechanical, without fatigue or failure; (d) provide an acoustic impedance readily matchable into the acoustical coupler between the transducer and the work; (e) have high thermal conductivity to assist with cooling; (f) have a high Curie temperature; (g) be available in appropriate sizes and geometries; and (h) be convenient to join to other components, such as couplers.

On due consideration of the characteristics and availability of transducer materials, the potential of ceramic transducers for more efficient, cheaper, and more compact acoustical energy devices is obvious. However, it has been difficult or impossible to realize this potential in practice, particularly as aforesaid in applications requiring the delivery of substantial amounts of power to the work. Obstacles have included the Curie point of the ceramic transducer, and the strength of the ceramics.

Thus, the above-mentioned types of transducers are subject to heating, especially when operated over an extended period and/or when operated at high powers. Conversion efficiency is affected by such heating, there being progressively greater impairment of efficiency as the Curie point of the transducer is approached and either temporary or permanent loss of transducer function when the Curie temperature has been exceeded. With most ceramic transducer materials to date, the Curie point is relatively low and the penalty for overheating is temporary or permanent damage to the transducer.

Optimizing of ceramic material compositions and manufacturing processes (especially with regard to Curie point) has been and is receiving considerable attention. Somewhat less attention has been paid to the strength and other properties of these materials, such as will facilitate their use under load in practical devices. Thus, like magnetostrictive transducer materials, ceramic transducer materials do not in themselves necessarily constitute useful transducers for ultrasonic systems such as are used for welding, extruding, drawing, machining and the like, but must be fabricated by various means into practical transducer assemblies that can be incorporated into useful transducer-coupling systems. For example, designs having one or more tubular ceramic elements held in place with axial tie-bolts and/or an adhesive have been in limited use, but such designs presently have numerous disadvantages, particularly for continuous-duty high-power performance.

Inasmuch as a single transducer inherently has a limited power handling capacity due to geometric and thermal limitations, the use of a plurality of such elements with a single acoustical coupling system is indicated, for purposes of providing the increased amounts of power requisite in certain applications of vibratory energy. However, the use of multiple transducer elements in a single assembly tends to further complicate the situation, rendering even more difficult the solution of problems such as those associated with adhesives, cooling, and cyclic tension-loading.

It has been proposed heretofore (as in U.S. Patent 2,930,912 issued March 29, 1960 in the name of Harry B. Miller and entitled "Composite Electromechanical Transducer") to use mechanical joining means in preference to adhesive-joining means for holding together the components of a composite electromechanical transducer unit, and especially for pre-compression loading of the ceramic transducer elements in the direction of acoustical wave propagation to a position of maximum contraction without such a bias, for purposes such as insuring that the transducer elements will not fail in tension during operation.

However, it has been found that prior art assemblies have limitations tending to preclude their use in high power applications, such as applications where the output of the transducer array into the waveguide that conducts the vibratory energy to the work area is in the range of about 60 acoustical watts/square inch and upwards into the range above 175 acoustical watts/square inch.

For example, in connection with the application of continuous mechanical compressive force or bias by various means suggested for such an assembly, it has been found that: (1) the use of a slender center bolt tends to lead to breakage of the bolt before sufficient compression can be applied; (2) the use of a large center bolt necessitates a redistribution of the requisite cross-sectional area of the assembly towards its periphery, resulting in an excessively large over-all size for the assembly; (3) if peripheral bolts and clamping plates are employed, these are objectionable for several reasons including especially the introduction of spurious vibrations which are wasteful of vibratory energy. None of these types of units is known to have enabled the practical realization of substantially the full potential for electromechanical conversion efficiency of the tranducer elements per se.

The present invention, on the other hand, is able to provide efficient outputs in the power range indicated, having such advantages as being substantially symmetrical, free from resonatable atatchments such as bolts, etc., and essentially free of vibratory modes other than the axial.

It is an object of the present invention to provide a novel transducer assembly.

It is another object of the present invention to provide a novel transducer assembly capable of having a useful electromechanical conversion efficiency of up to approximately 60–90 percent.

It is another object of the present invention to provide a transducer assembly having ceramic transducers pre-loaded in compression.

It is another object of the present invention to provide a transducer assembly having good stability under temperature conditions and capable of being coupled efficiently to elements of an acoustical system.

It is another object of the present invention to provide a transducer assembly which need not utilize adhesives as a means for joining component elements thereof.

It is another object of the present invention to provide a transducer assembly which is efficient, inexpensive, compact, and armored.

Other objects will appear hereinafter.

For the purpose of illustrating the invention there is shown in the drawings a form which is presently preferred. It is to be understood, however, that this invention is not limited to the precise arrangements and instrumentalities shown.

Figure 1:
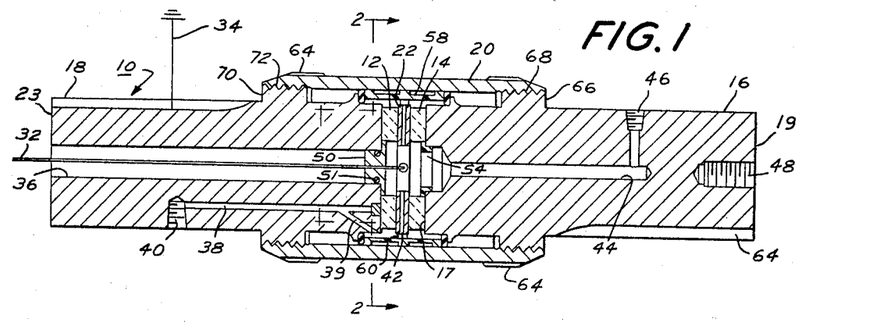
FIGURE 1 is a view, partly in section and partly in elevation, of a transducer assembly constructed and arranged according to the invention.

Referring to the drawings in detail, wherein like reference numerals indicate like elements, there is shown in FIGURE 1 an elongated transducer assembly designated generally by the numeral 10.

Transducer assembly 10 includes transducer elements 12 and 14, acoustical coupling member 16, acoustical stabilizing member 18, and acoustical tension member 20. Said system preferably is dimensioned to operate at a given frequency, which is a resonant frequency, and said assembly is preferably dimensioned to have an over-all length of a whole odd number multiple of one-half wavelength with the preferable minimum over-all length being three one-half wavelengths (one and one-half wavelengths).

Transducer elements 12 and 14 are of the electrostrictive type and are made of ceramic material. The construction of a suitable transducer of this type per se is well known to those skilled in the art and does not form a part of the present invention and, accordingly, no detailed description of its construction will be made herein. A wide variety of ceramic materials may be used in constructing the transducer elements 12 and 14, including, for example, barium titanate or lead-zirconate-titanate. However, lead-zirconate-titanate material is presently preferred, such as is commercially available as PZT–5 from Clevite Corporation of Cleveland, Ohio.

It is to be noted that materials such as PZT–4 and PZT–5 are commercially available from the same source, and that PZT–4 is the more suitable of the two for applications requiring relatively large amounts of power. The exact composition of PZT–4 is not presently available, but certain of its properties are known from the literature, as, for example, at pages 52 and 53 of Ultrasonic Technology by Richard G. Goldman, published in 1962 by Reinhold Publishing Corporation, wherein the Curie temperature of PZT–4 is reportedly 340° C. (as against 120° C. for barium titanate). Whereas magnetostrictive transducers are generally polarized while in operation, ceramic transducers are usually permanently polarized by the manufacturer in order to achieve the maximum transducer response for the vibratory mode at which the transducer is to be driven. PZT–4 has been reported to have a theoretically attainable electromechanical conversion efficiency of up to 92 percent. It is understood that a new material, PZT–8, offers improvements over PZT–4.

Ceramic-type transducers can be made in almost any size and shape desired. The transducer elements 12 and 14 of FIGURE 1 are in washer form, having a hole formed centrally therein and extending therethrough from one broad surface to another.

The power handling capacity of PZT–4 in thin disk or washer form has been reported to be 6 watts/cubic centimeter/kilocycle. For example, a disk with a diameter of 4 inches, 0.16-inch thick, and with a center hole equal to 50 percent of its area has a power handling capacity of about 1400 watts when operating at a frequency of 15 kilocycles per second; two such disks could handle twice the wattage, or between 2 and 3 kilowatts of electrical input power.

For purposes of illustration, the embodiment of FIGURE 1 will be described in connection with a transducer assembly designed to operate at 15 kilocycles per second. Transducer elements 12 and 14 were polarized in the thickness mode and, in this instance, each had the following dimensions: thickness 0.375-inch; I.D. 0.625-inch; O.D. 2.750 inches; projected area 5.633 square inches.

Sandwiched between transducer elements 12 and 14 is a washer 22, of suitable dimensions such as approximately the same O.D. and I.D. as that of elements 12 and 14 but 0.125-inch thick.

In accordance with standard practice, transducer elements 12 and 14 are preferably metal-coated, such as silver-coated, on their broad flat surfaces for uniform powering purposes, so that they will expand or contract if a voltage is applied to said silver coatings, in which case they will vibrate at the frequency of the applied signal.

Thus, in FIGURE 1, a suitable source (not shown) applies an A.C. voltage to assembly 10 through a pair of electrical conductors 32 and 34. Conductor 32 extends longitudinally of assembly 10 through an axial bore 36 formed in member 18, and through the hole in transducer element 12, to an electrical connection with washer 22, and electrical contact is established through said washer 22 with the inwardly facing flat surfaces of transducer elements 12 and 14. Conductor 34 is secured to acoustical member 18, thereby establishing electrical contact through member 18, sleeve 20, and member 16 with the outwardly facing flat surfaces of elements 12 and 14. Thus, the inner end faces of members 16 and 18 are at ground potential, and A.C. voltage is applied to opposite faces of transducer elements 12 and 14 (through said metal coatings).

It is to be noted that relatively high voltage are generally involved, and provision should therefore be made to guard against arcing between metal parts, such as may occur in spite of the annular air space between washer 22 and sleeve 20, for example. An insulation member 58, of tubular or sleeve-like form and made of non-conductive material such as Teflon, is therefore provided. Opposite end portions of insulation member 58 respectively engage outer peripheral surface portions of acoustical member 18 and acoustical member 16 which lie inwardly of sleeve 20. An intermediate portion of insulation member 58 surrounds transducer elements 12 and 14 and washer 22, but in spaced relationship, shielding them from arcing.

Compressing transducer elements 12 and 14 and washer 22 between each of their end faces and in coaxial alignment are an acoustical coupling member 16 and an acoustical stabilizing member 18. Acoustical member 16 has an inner end face 17 and an outer end face 19, and acoustical member 18 has an inner end face 21 and an outer end face 23, all of said end faces lying in parallel planes disposed normal to the longitudinal axis of the assembly 10. Members 16 and 18 are rigidly connected together in spaced relationship by threaded connection with a tubular coupling sleeve 20, which is described in detail hereinbelow.

Although, as described below in connection with FIGURES 5 and 6, the washer 22 may be made of other material, members 16 and 18, sleeve 20, and washer 22 of FIGURE 1 in this instance may all be made from beryllium-copper material, or K-Monel, or any other material having low hysteresis, good thermal conductivity, and high transmission efficiency even when strained as much as 0.001-inch per inch, for example, including such materials as aluminum-bronze. The materials named are non-magnetic and are known to the art for their relatively good acoustical power handling qualities. The relatively good thermal conductivity of beryllium-copper or aluminum-bronze aids in dissipating excess heat from transducer elements 12 and 14, thereby lessening the cooling problem. K-Monel has a higher velocity of sound than beryllium copper (and consequently a longer wavelength to minimize the proportion of ceramic drive to the total assembly wavelength). However, K–500 Money may present too much machining difficulty in unusual geometries, such as in the precision fit for the inclined load-bearing faces of the buttress threads described hereinbelow. Other than very smooth cutting of the Monel could lead, for example, to fatigue failure under high-stress cyclic loading.

Figure 3:
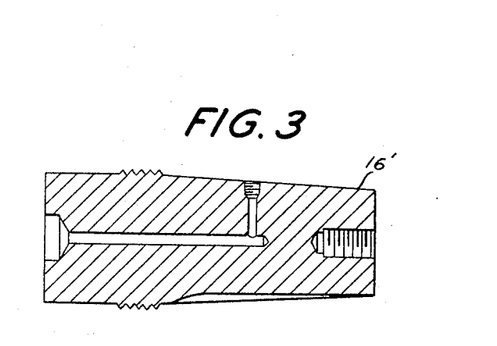
FIGURE 3 is a vertical sectional view of a modified component of the transducer assembly of the present invention.

As shown in FIGURE 1, member 16 has a length equal to three-quarters of a wavelength, (which is an odd number multiple of one-quarter wavelength) in the material of which the member 16 is made at the frequency of operation. As also shown in FIGURE 1, member 16 has a substantially constant cross section. However, it is to be understood that member 16 may be a mechanical transformer which is contoured for purposes of increasing amplitude of vibration. It may comprise a single member or, for purposes of manufacturing convenience, it may comprise a cylindrical portion (one-quarter wavelength long) joined in end-to-end contact with a tapered portion (one-half wavelength long, the tapered portion by means of its increasingly smaller cross section affording the increased amplitude. The tapered portion (such as tapered portion $16^1$ extending toward the outer end face 19, as in FIGURE 3) may be shaped so as to provide a linear taper, for example, or a taper that is an exponential function of its length and satisfies the following equation:

$$S = S_o e^{-2Tl}$$

where S is the reduced area at any section of the tapered portion, $S_o$ is the area of the cylindrical portion, T is a constant describing the taper, and $l$ is the length of the tapered coupler. This equation and the boundary conditions for resonance of a coupler such as coupled $16^1$ are set forth at page 163 of Piezoelectric Crystals and Ultrasonics by Warren P. Mason, published in 1950 by D. Van Nostrand Company.

The outer end of coupling member 16 or $16^1$ (such as outer end face 19 or its periphery or a portion of its periphery) may be in direct contact with a medium to which the acoustical energy is to be delivered. Also, and as shown in FIGURE 1, member 16 may be provided with an internally threaded hole 48 in outer end face 19, so as to accept a stud permitting a connection such as a threaded connection to the next adjoining acoustical component, which may, for example, be in an arrangement such as that of FIGURE 4 or may be a waveguide in ultrasonic extrusion or drawing or drilling or machining apparatus.

As shown in FIGURE 1, acoustical member 18 may have a length like that of member 16, namely, three-quarters of a wavelength, or (and also like member 16) it may have a longer length so long as such total longer length is an odd integer multiple of one-quarter wavelength.

In accordance with principles well known to those skilled in the art, for efficient operation as for avoiding changes in sound velocity, mode, etc., the total solid-portion-diameter cross section of members 16 and 18 is preferably no more than about one-quarter wavelength.

It is to be noted that, as aforesaid, the overall length of assembly 10 is a whole number multiple of one-half wavelength, such as and preferably three one-half wavelengths. It will be appreciated that slight adjustment of the three-quarters of a wavelength dimensioning of member 16 and/or member 18 may be necessary to allow for such length as is required for the relatively thin transducer elements 12 and 14 and the washer 22. Particular advantages of the aforesaid dimensioning are described hereinbelow.

Tubular acoustical tension sleeve 20, as shown in the drawing of FIGURE 1, is a single one-half wavelength long. However, it may have a length equal to a whole number multiple of one-half wavelength, if the length of the remainder of the assembly is adequate to accommodate such a length of sleeve 20 may be necessary to accommodate the threaded lengths of members 16 and 18, described herein, so that said threaded portions will have adequate strength for application of the necessary clamping force.

One end of sleeve 20 is threadedly connected to member 16, and the other end of sleeve 20 is threadedly connected to member 18, the threaded connections being preferably, for efficient operation, located at an antinode (loop) region of the vibration on each members 16 and 18.

Thus, members 16 and 18 are each provided with an annular boss designated 66 and 70 respectively, on which preferably buttress threads are formed. In the illustrated embodiment, which as aforesaid is three one-half wavelengths long from outer end face 19 to outer end face 23, each such boss is located at a distance of one-half wavelength from the outer end face of the member on which the boss is provided, thereby being located approximately one-quarter wavelength from the inner end face (17 or 21 as the case may be) of the respective member involved. The cooperating buttress threads between the bosses 66 and 70 and the coupling sleeve 20 are designated 68 and 72 respectively.

In addition, members 16 and 18 and sleeve 20 are each provided with longitudinally extending grooves 64 on their outer surfaces, in order to provide for engagement with spanner wrenches which resist displacement when members 16 and 18 are held fast and a torsional load is applied to sleeve 20 through its spanner wrench, as noted below.

In assembling the transducer assembly 10 of the present invention, the transducer elements 12 and 14 are subject to compression as follows: members 16 and 18 are held fast by the aforementioned spanner wrenches, and sleeve 20 is rotated with respect to members 16 and 18 in such a direction about the longitudinal axis of the assembly as will enable the cooperating left and right hand threads 68 and 72 respectively (note the opposed hand of these threads) to draw members 16 and 18 together. Thereby, members 16 and 18 can be drawn together and securely fastened without necessity for relative rotational movement therebetween, which could damage the ceramic elements and/or which did cause residual torsional stresses in the assembly, causing undesirable extraneous torsional vibration response under some conditions. Rotation of sleeve 20 in the opposite direction will, of course, move the components apart and remove the compression from transducer elements 12 and 14.

For the transducer 12 and 14 those characteristics and dimensions have been described herein, 5000 p.s.i. compressive load was used successfully, this amount being obtainable by selective adjustment of the threaded connections between sleeve 20 and members 16 and 18. The permissible amount of compressive load for use with transducer elements of know characteristics and various dimensions is well known to or ascertainable by those skilled in the art and is usually expressed in terms of pounds per square inch of transducer elements surface.

A cooling system is provided, in order to dissipate heat from the transducer elements 12 and 14. The coolant employed in the described version of assembly 10 was transformer oil, although various other kinds of coolant may be used, if they are clean and do not conduct electricity. For purposes of the embodiment of FIGURE 1 of the present invention, oil cooling was found to be superior to compressed air cooling (which operated with adiabatic expansion, the air being introduced through edge orifices in transducer assembly space plates), but the transformer oil coupled vibration into the other portions of the assembly resulting in a reduced over-all energy conversion efficiency by the transducer assembly.

In operation, the coolant was introduced to the assembly 10 through a radially extending inlet opening 40 in the surface of member 18. Inlet opening 40 is positioned intermediate the ends of member 18. From inlet opening 40, the coolant travels inwardly along a longitudinally extending passageway 38 in member 18, said passageway 38 extending between inlet opening 40 and through 39 to an annular space immediately surrounding the outer periphery of the washer 22. The coolant then proceeds radially inwardly through a plurality of radially extending holes 42 in washer 22 into the core of washer 22, the size and number of holes 42 being sufficient to match the flow area of the passageway 38. The coolant is next discharged through an axially extending passageway 44 and a radially extending outlet 46, said passageway 44 extending axially from the inner end face 17 of member 16 to said outlet 46 which is formed in member 16 intermediate its ends. Suitable means (not shown) is provided to dissipate the heat transferred to the coolant from transducer elements 12 and 14 and also to recirculate the coolant.

The coolant is prevented from entering the bore 36 by means of a stepped plug 50, made of Teflon, which is provided with an O-ring seal 51 abutting the inside wall of bore 36 for seal integrity purposes. Plug 50 has a largeh-outside diameter section whose circular edge configuration snugly engages the inner surface of transducer 12, and a section of reduced cross-sectional area whose circular outer periphery snugly fits bore 36 at its end adjacent to transducer 12. Plug 50 thereby snugly engages a portion of bore 36, the inner end face 21 of member 18, and the inner annular surface of transducer element 12, so as to tightly seal these surfaces against leakage of coolant between them and plug 50. Plug 50 is apertured centrally thereof to permit conductor 32 to pass therethrough while remaining in liquid-tight engagement therewith.

Plug 50 also helps to position transducer element 12 concentrically with respect to member 18. Transducer element 14 and member 16 are similarly positioned in coaxial alignment by means of a hollow stepped Teflon grommet 54, without interfering with the free flow of coolant from the cone of washer 2 through passageway 44.

Thus, the larger portion of grommet 54 has its circular edge configuration snugly fitting the inside diameter of transducer element 14, and the smaller-peripheried portion of grommet 54 is adapted to engage a concentric annular recess in the inner end face 17 of member 16.

Figure 2:
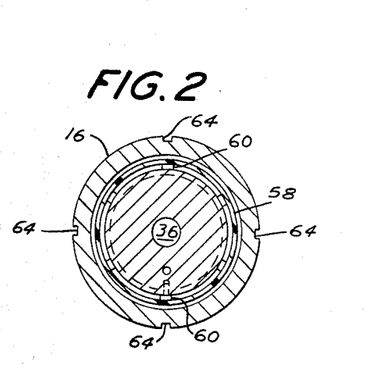
FIGURE 2 is a transverse sectional view of the transducer assembly of FIGURE 1 taken along the lines 2—2 of FIGURE 1.

Midway along the length of insulation member 58 are a plurality of radially inwardly directed ribs 60 (FIGURE 2 shows six of these ribs) which engage the outer circular periphery of washer 22 for purposes of concentric axial alignment with transducer elements 12 and 14 and acoutical members 16 and 18. The spaced relationship of insulation member 58 with respect to transducer elements 12 and 14 and washer 22 ensures free flow of coolant from passageway 38–39 to holes 42 in washer 22.

The symmetrical (and armored) aspects of the present invention may be noted from the drawing and description of FIGURE 1, the entire assembly being substantially symmetrical about the plane defined by the oil holes 42 through the metal washer spacer 22.

It is to be noted that the sleeve 20 is preferably and readily proportioned to have substantially the same cross-sectional area as that of the cross section of the members 16 and 18, so as between about 0.7 to about 1.3 times the cross section of the members 16 and 18. Thus, when preload is applied by generating tension sleeve 20 via the threads at 68 and 72, there will exist in the cross sections of 16 and 18 an approximately equivalent compressive stress. Therefore, when the unit is excited vibratorily, the cycling compressive stress in members 16 and 18 toward elements 12 and 14 is matched by cycling tension stress in sleeve 20, and this opposed spring system operates symmetrically. If the cross section of sleeve 20 is significantly less than indicated, for example, high tension stresses productive of fatigue failure will obtain and members 16 and 18 will be stressed to low compression values, so that the system does not operate symmetrically.

Further advantages of the symmetry of the present invention, involving for example the length dimension of one and one-half wavelengths from one outer end face to the other outer end face, are the following: (1) the threaded peripheries of the members 16 and 18 engaging the internal threads of the sleeve 20 are less rigidly restricted as to span along the axis of the member 18 or the member 16; (2) the length dimensions of members 16 and 18 provide relatively large heat sinks for energy not delivered as acoustical energy by the transducer elements 12 and 14 as well as more radiating area to dissipate such heat externally; and (3) the inner end faces 17 and 21 abutting the transducer elements 14 and 12 respectively remain almost perfectly flat under the influence of the substantial clamping load applied from sleeve 20, and this is an important factor in avoiding fracture of the transducer elements during high-power operation. It is to be noted that the members 16 and 18 are preferably made of material or materials having the same and not differing mechanical and physical properties.

Figure 4:
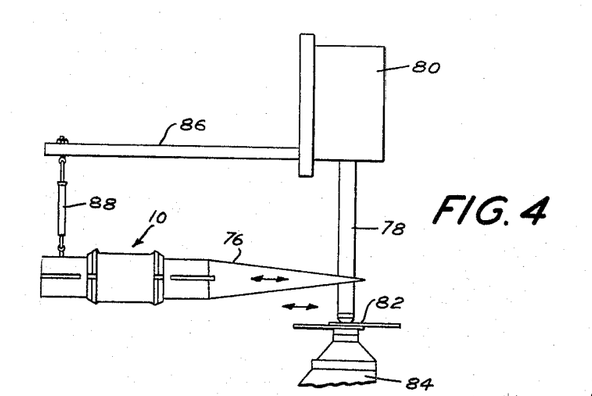
FIGURE 4 is an elevational view of the transducer assembly of FIGURE 1 incorporated in ultrasonic welding apparatus.

In FIGURE 4, the invention is shown applied to vibratory welding apparatus (see, for example, U.S. Patent 2,946,119 entitled "Method and Apparatus Employing Vibratory Energy for Bonding Metals," which issued July 26, 1960, in the names of James Byron Jones, William C. Elmore, and Carmine F. De Prisco). Here, the transducer assembly 10 is connected to a coupling member 76 of the mechanical transformer type, which member 76 is joined to a sonotrode member 78. Sonotrode 78 is supported within a mass 80 which serves to preclude the transmission of significant levels of vibratory energy to the structure supporting said mass 80. Mass 80 is carried on a vertical way slide system (not shown) which is actuated by a hydraulic system (not shown) to apply, in addition to the vibratory energy supplied by sonotrode 78, a clamping force to a weldment 82 positioned between the welding tip of the sonotrode 78 and the face of the anvil member 84. The transducer assembly of FIGURE 4 is supported at acoustical stabilizing member 18 thereof from a cantilever 86 and a vertically extending connecting link 88.

For electrical (especially insulation) reasons apparent to those skilled in the art, it is necessary that the transducer assembly 10 of the present invention utilize an even number of appropriately dimensioned, powered, and cooled transducer element washers, such as two or four or six. For efficient operation also, it is preferred that such transducer washer elements number no more than six, inasmuch as the transducer elements should be centrally located in the assembly and not be located toward the antinode (loop) positions where the sleeve 20 is threadably connected to members 16 and 18. When more than two washers are utilized, appropriate electrical connections to the washer surfaces will be necessary, as can be readily provided by those skilled in the art. The usual attention to polarity will be needed; for example, the inner surfaces of transducer elements 12 and 14 in contact with washer 22 must be of the same polarity (positive or negative) so as to provide suitable in-phase mechanical motion.

Operating at various power levels (as shown in column 1 of the following chart), a transducer assembly in accordance with the present invention, dimensioned to have a nominal frequency of 15,000 cycles per second and incorporating two ceramic transducer elements having the dimensions hereinabove indicated for use in the 15 kc. assembly, produced electromechanical conversion efficiencies as shown and confirmed in columns 7 and 8 of the chart according to the data summarized in columns 2 through 6 of the chart.

The increased conversion efficiency (63% to 92%) with increased power (up to 1,000 watts), expressed as electrical input to the transducer assembly, is significant, as is the fact that an essentially duplicate experiment involving a standard nickel transducer in the same range of power inputs exhibited a conversion efficiency of about 35%, which is a reported high value for nickel transducers at these power levels.

The above-mentioned conversion efficiencies were determined by a direct calorimetric technique, inasmuch as the motional impedance loop evaluation technique conventionally used is generally appropriate only at the relatively lower power levels used for instrumentation purposes, for example. This calorimetric technique involves attaching the transducer assembly to be evaluated to an acoustical coupling member (in a manner essentially the same as it would be attached in a vibratory welding machine, for example), which coupling member is connected directly into an energy absorber (such as a large block of lead), in which a cooling coil carries away the vibratory energy which is degraded to heat in the lead billet.

Columns 3, 4 and 5 of the chart show the input and output water temperature and the mass rate of water flow which permits calculating the data of column 8. Confirming data of column 7 is arrived at by measuring the electrical energy necessary to stabilize the calorimetric mass by built-in heaters, as indicated by the data of column 2. In short, the data of column 2 operates the calorimeter at a level approximating the acoustical test value and shows that the calorimeter is properly operating, whereas the data of column 8 summarizes accurately the calculated energy delivered to the calorimeter acoustically and measured in the usual mass rate of water flow and temperature rise data.

| Electrical Input Watts to Transducer ($P_1$) (1) | Calibrating Watts to Calorimeter ($P_2$) (2) | Water Temp. (C.) Input (3) | Water Temp. (C.) Output (4) | Water Flow Rate (gm./sec.) (5) | Power Absorbed by Water (watts) ($P_3$) (6) | Transducer Efficiency (percent) $P_2/P_1$ (7) | Transducer Efficiency (percent) $P_3/P_1$ (8) |
|---|---|---|---|---|---|---|---|
| 0 | 200 | 23 | 34 | 4.1 | --- | --- | --- |
| 300 | 0 | 23 | 34 | 4.1 | 190 | 67 | 63 |
| 0 | 350 | 23 | 42 | 4.1 | --- | --- | --- |
| 500 | 0 | 23 | 42 | 4.1 | 330 | 70 | 66 |
| 0 | 600 | 23 | 57 | 4.4 | --- | --- | --- |
| 750 | 0 | 23 | 57 | 4.4 | 630 | 80 | 84 |
| 0 | 925 | 23 | 62 | 5.6 | --- | --- | --- |
| 1,000 | 0 | 23 | 62 | 5.6 | 920 | 93 | 92 |
| 0 | 870 | 23 | 77 | 4.2 | --- | --- | --- |
| 1,250 | 0 | 23 | 77 | 4.2 | 788 | 75 | *63 |

*System failed electrically.

Another 15 kc. embodiment of FIGURE 1, rated 4.5 kilowatts, was made of beryllium copper (aged); with an Invar–36 spacer having O.D. 3.252 inches, I.D. one inch, and thickness 0.140-inch; and with two transducers elements each 0.50-inch thick with I.S. of one inch and O.D. 2.80 inches. This unit gave the results indicated in the following chart. Thus, under continuous-duty operation, electromechanical conversion efficiencies ranged from 69 to 77 percent at input power levels of from 600 to 3000 watts, and on a 50 percent duty cycle basis (pulse duty of 1 second on and 1 second off) conversion efficiencies of 64 to 76 percent were achieved at power input levels up to 5000 watts.

| Electrical Input Watts to Transducer Maximum (1) | Electrical Input Watts to Transducer Average ($P_1$) (2) | Calibrating Watts to Calorimeter ($P_2$) (3) | Change in Water Temp. (° C.) (4) | Water Flow Rate (gm./sec.) (5) | Power by Water (Watts) ($P_3$) (6) | Transducer Efficiency (percent) $P_2/P_1$ (7) | Transducer Efficiency (percent) $P_3/P_1$ (8) |
|---|---|---|---|---|---|---|---|
| CONTINUOUS DUTY CYCLE | | | | | | | |
| 600 | 600 | --- | 18.0 | 5.58 | 415 | --- | 69.5 |
| 1,000 | 1,000 | --- | 27.2 | 6.35 | 740 | --- | 74.0 |
| 1,450 | 1,450 | 1,120 | 43.0 | 6.15 | 1,106 | 77.2 | 76.3 |
| 2,000 | 2,000 | 1,470 | 41.6 | 8.46 | 1,480 | 73.5 | 74.0 |
| 2,500 | 2,500 | 1,850 | 51.9 | 8.54 | 1,850 | 74.0 | 74.0 |
| 3,000 | 3,000 | 2,220 | 57.9 | 9.16 | 2,210 | 74.1 | 73.8 |
| PULSED DUTY CYCLE (1 SECOND ON, 1 SECOND OFF) | | | | | | | |
| 2,750 | 1,375 | --- | 30.5 | 8.16 | 1,050 | --- | 76.0 |
| 3,300 | 1,650 | --- | 36.3 | 8.32 | 1,265 | --- | 76.5 |
| 4,000 | 2,000 | --- | 36.3 | 8.52 | 1,300 | --- | 65.0 |
| 4,500 | 2,250 | --- | 40.8 | 8.75 | 1,530 | --- | 68.0 |
| 5,000 | 2,500 | 1,610 | 42.2 | 9.10 | 1,610 | 64.4 | 64.4 |

Figure 5:
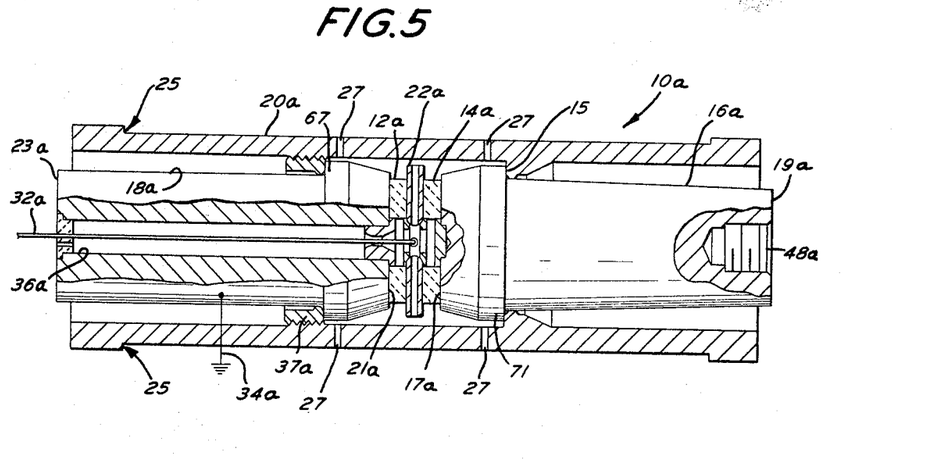
FIGURE 5 is a view, partly in section and partly in elevation, of another embodiment of the transducer assembly of the present invention.

FIGURE 5 shows another embodiment of the present invention, wherein the assembly is designated generally as 10a, and the major components include transducer elements 12a and 14a, acoustical coupling member 16, acoustical stabilizing member 18a, and acoustical tension member 20a.

For operation at a nominal resonant frequency of 15,000 cycles per second and to handle about 4.5 kilowatts of electrical power input, this design includes PZT–4 transducer elements each polarized in the thickness mode and each having the following dimensions: thickness 0.50-inch; I.D. 0.94-inch; O.D. 3.4 inches; projected area 7.63 square inches (projected area refers, of course, to the plan form area of one transducer element).

Washer 22a may be made of a low-expansion alloy (such as Invar 36, a low-thermal-expansion-coefficient nickel-iron alloy made by Carpenter Steel Company and obtainable through its sales office at Fort Washington, Pennsylvania). In FIGURE 5, typical design dimensions were as follows: O.D. 3.74 inches; I.D. 0.625-inch; thickness 0.125-inch. This alloy and its dimensioning proved to be a useful aid in attempting to match the thermal expansion of the ceramic elements as closely as possible, so as to reduce transverse stress on the metal-ceramic joints thereby reducing the probability of extraneous loss of energy and of joint failure. Members 16a, 18a, and 20a may, as aforesaid, be made of Monel K–500 or other suitable acoustical material.

Tubular acoustical tension sleeve 20a, as shown in FIGURE 5, was three one-half wavelengths long, according to the material of which it was made at the design frequency. Thus, at 15 kc., a Monel K–500 sleeve 20a would have a physical length of 17.40 inches.

The slight protrusion of end faces 19a and 23a beyond the respective end faces of sleeve 20a, while not mandatory, serves to facilitate both attachment of the sleeve 20a to the remainder of the assembly and connection of electrical and cooling junctions.

As shown in FIGURE 5, sleeve 20a is coupled to members 16a and 18a. Thus, sleeve 20a is threadedly connected to member 18a through a locking collar 37a (made of appropriate acoustical material such as Monel K–500), and sleeve 20a is in contact with member 16a at shoulder 15, the connection areas being preferably, for efficient operation, located at an antinode (loop) of the vibration on each members 16a and 18a (and also at a loop region on sleeve 20a).

Members 16a and 18a are each provided with a peripheral shoulder designated 67 and 71 respectively. In the illustrated embodiment of FIGURE 5 which as aforesaid is substantially three one-half wavelengths long from outer end face 19a to outer end face 23a, each such shoulder is located at a distance of one-half wavelengths from the outer end face of the member on which the shoulder is provided, thereby being located approximately one-quarter wavelength from the inner end face (17a or 21a as the case may be of the respective member involved).

The ceramic materials generally used as transducer elements are brittle, have low tensile strength, and can be used at high power levels only under a static biasing or compressive stress. It is very desirable for efficient operation to minimize or preclude tensile stress in the ceramic under maximum cyclic drive conditions. However, the stressing means must be provided a sink for significant amounts of vibratory energy.

In assembling the transducer assembly 10a of the present invention, the transducer elements 12a and 14a are subjected to compression as follows: The sleeve 20a is clamped and supported at the shoulder 25 on the base of a hydraulic press, and the ram of the press is pushed against the face 23a until the desired compressive stress level is achieved on the elements 12a and 14a. The locking collar 37a is then set into position. It is to be noted that shoulder 67 on member 18a and shoulder 71 on member 16a and shoulder 15 on sleeve 20a must be adequate to withstand the compressive stress applied by the hydraulic press, such as 5000 p.s.i. compressive load on the transducer elements in the described embodiment.

In the embodiment of FIGURE 5, cooling air may be conducted concentrically with the power lead 32a to the central area, where it passes through the holes in the center washer 22a to the annular area between the sleeve 20a and the transducer elements 12a and 14a, and thence outward through drilled ports 27 in sleeve 20a.

As may be seen, the embodiment of FIGURE 5 requires less time and care to assemble at the desired stress level, is more readily machinable, and reduces requirements (re tension shell eccentricity) for radial stiffness in the thread areas as compared with the embodiment of FIGURE 1 (which reduces relative motion and consequent vibration degration to heat between the threaded end sections and the shell 20a).

Figure 6:
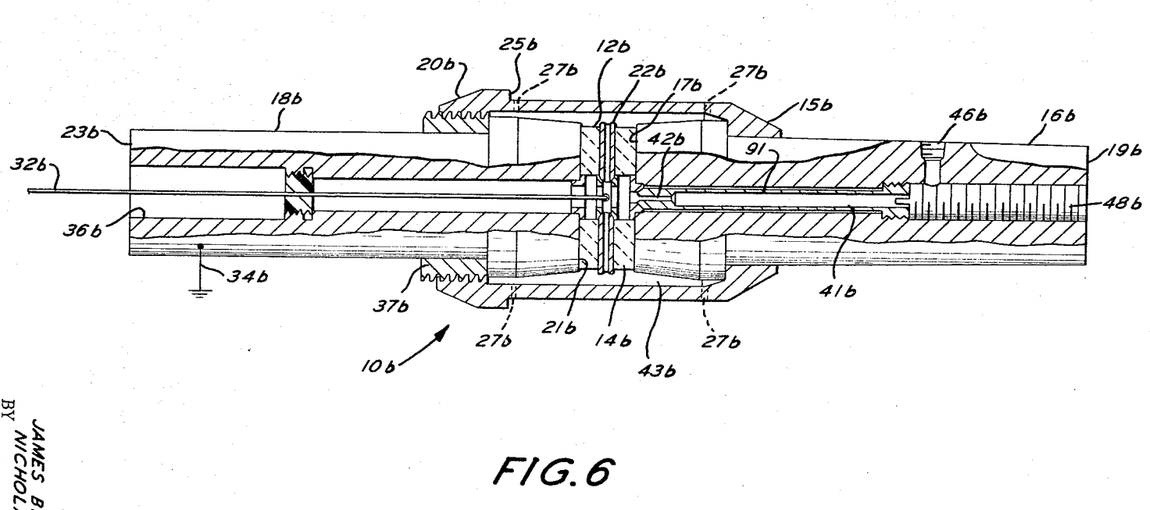
FIGURE 6 is a view, partly in section and partly in elevation, of still another embodiment of the present invention.

FIGURE 6 shows another embodiment of the present invention, wherein the assembly is designated generally as 10b, and the major components include transducer elements 12b and 14b, acoustical coupling member 16b, acoustical stabilizing member 18b, and acoustical tension member 20b. Generally, elements of assembly 10b corresponding to the elements of assembly 10a are provided with corresponding numerals followed by the letter b.

For operation at a nominal resonant frequency of 15,000 cycles per second and to handle about three kilowatts of electrical power input, a typical embodiment may include PZT–4 transducer elements each polarized in the thickness mode and each having the following dimensions; thickness 0.306-inch; I.D. 0.750-inch; O.D. 2.70 inches; projected area 5.284 square inches. Washer 22b, when made of Invar 36 nickel-iron alloy, may have the following dimensions: O.D. 3.05 inches; I.D. 0.55-inch; thickness 0.200-inch.

Members 16b, 186 and 20b may, although not necessarily, be made of Type 303 stainless steel, since this is a readily available material and has a longer wavelength than many other such materials, thereby enabling the ceramic elements and washer to constitute a smaller fraction of the assembly, as aforesaid. Sleeve 20b (like the sleeve in FIGURE 1 but unlike the sleeve in FIGURE 5) may be a single one-half wavelength long in an assembly having a total length of one and one-half wavelengths.

Members 16b and 18b (like FIGURE 5 but unlike FIGURE 1) are shown as rigidly coupled together in spaced relationship by connection with sleeve 20b via a threaded connection through a locking collar 37b and a shoulder 15b. The assembly 10b may be subjected to compression on a hydraulic press in the manner described with respect to FIGURE 5, and again a compressive load such as 5000 p.s.i. may be used on the transducer elements.

FIGURE 6 has the advantages of increased ease of fabrication as well as reduced criticality of alignment. The angle of the buttress threads is to be particularly noted, inasmuch as improperly angled buttress threads can contribute to relative motion and energy loss due to heating, especially under continuous stress conditions at high power. For example, 7-degree negatively-inclined load-bearing faces were found preferable to 1-degree positively-inclined load-bearing faces.

Cooling of the unit shown in FIGURE 6 is accomplished with very clean compressed air which is introduced through threaded connection 46b in coupler 16b, passing axially along the passageway 41b in tube 91 through expansion orifice 42b and radially outward through the holes in the central spacer washer 22b into annular chamber 43b and through drilled ports 27b in sleeve 20b.

The embodiments of FIGURES 5 and 6 may be provided with an insulation member (not shown) similar to insulation member 58 of FIGURE 1, made of non-conductive material such at Teflon or Mylar, in order to safeguard against arcing between metal parts which may be encountered in view of the relatively high voltages generally involved.

Figure 7:
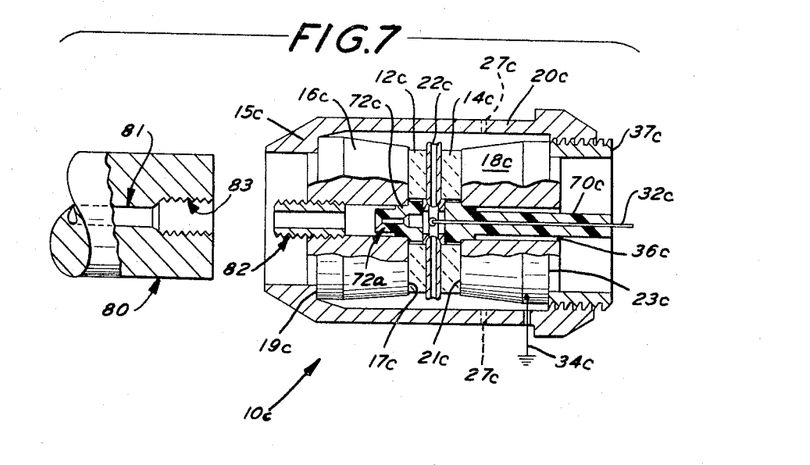
FIGURE 7 is a view, partly in section and partly in elevation, of another embodiment of the transducer assembly of the present invention.

In the embodiment of FIGURE 7, the over-all length of the assembly 10c is essentially a single one-half wavelength. The overhung one-half wavelength ends shown in FIGURES 1, 5 and 6 have been omitted. A low-stress area (antinode or loop) of the vibration is at each end of the assembly. While this construction is not preferred (because of a number of practical considerations, such as those having to do with convenience of assembly and of introduction of cooling air or high-frequency electrical energy, for example), such assemblies can be built and operated for use in certain types of applications, such as low-power operations or other less-critical situations.

Assembly 10c generally resembles the central portion of FIGURE 6 and corresponding elements are provided with corresponding numerals followed by the letter c. In this embodiment, each of the members 16c and 18c has a physical length substantially corresponding to one-quarter wavelength, although as aforesaid it will be appreciated that adjustment of the one-quarter wavelength dimensioning of members 16c and 18c may be necessary to allow for such length as is required for the transducer elements 12c and 14c and the washer 22c. Tension sleeve 20c has a length which is one-half wavelength.

In FIGURE 7, the member 70c (at its large end within the transducer element 14c) operates as a centering or locating collar to insure concentricity of transducer element 14c on the short coupling element 18c. For convenience, member 70c also provides an insulating tube within which the electrical connection 32c finds its way to the metal cooling spacer washer 22c. Member 70c is preferably made of a heat-resistant plastic such as Teflon or Mylar, materials which have been mentioned previously.

Similarly, member 72c provides the centering and locating device for the washer 12c, but member 72c incorporates an air passageway 72a which may also comprise a metering air orifice for the cooling air entering the transducer, passing through the heat-resistant member 72c and thence through the radial passageways in washer 22c.

Member 82 is a hollow attachment bolt by means of which the assembly 10c is attached to its waveguide or acoustical energy conductor which conducts the vibratory energy to the work. Not shown is an air connection on the coupler 80 which delivers air to the passageway 81 within the coupler. This passageway 81 is intended to extend along the coupler 80 to a convenient place at which an air connection can be made to the coupler. This can be via a small radially drilled hole in the coupler terminating in a tapped entry at the outer surface of the coupler 80 where an air connection can be made, preferably via an elastic and not a metallic tube. If desired, assembly 10c may be provided with an insulating member comparable to member 58.

While the dimensioning of the transducer elements used with the present invention is within the skill of the art, there is provided below a general description of such dimensioning in a particular application.

Thus, selection of dimensions for the transducer elements is principally based upon such design variables as frequency, power capacity, heat accommodation, and intended use (including safety factor and whether the assembly is intended for continuous or pulsed duty), in conjunction with manufacturers' specified operational characteristics for a particular transducer material.

For example, for continuous duty at 15 kc. to handle about 3.3 kilowatts, there must be considered the expected driving voltage, the volume of ceramic material being stressed, the heat power to be generated internally in the ceramic, the ceramic's thermal conductivity, and the available cooling means (for removing from the ceramic sufficient of the aforesaid internally generated heat to limit the temperature rise to a safe value, since a catastrophic cycle of increased power loss with increased temperature can otherwise result).

Such heat is due primarily to hysteresis associated with domain reversals in the dielectric of the ceramic, a factor generally designated as tan δ and representing the series-loss resistance of the ceramic as a clamped capacitance. The manufacturer has recommended that the ceramic be operated at a tan delta of less than 0.04. The thermal conductivity of ceramic transducers is relatively low (0.003 cal.-cm./cm.$^2$sec.° C. for PZT-4), and wafer-thin ceramic should theoretically insure minimum heating. However, power capability of these elements is based upon the volume of material being stressed, PZT-4's theoretical maximum under reasonably high loading conditions ($Q \to 1$) being as aforesaid 6 watts per cubic centimeter per kilocycle, or 90 watts per cm.$^3$ of material at 15 kc., the frequency of the examples above given. To design for a reasonable safety factor of two, this will mean loading the ceramic to 45 watts per cm.$^3$ and an assumed conversion efficiency of about 60 percent. At 3.3 kw. this will mean a volume of 73.5 cm.$^3$ and the necessity at 60 percent conversion efficiency for removing about 1.3 kw. in heat.

A reasonably minimum thickness of ceramic is therefore desirable, which will be predicated on the expected strain and hence the driving field potential, with the area of the ceramic being dependent upon the acoustic power output at the operating strain level. Since driving field is a function of tan δ, designing for tan δ of 0.03 (less than 0.04 for PZT-4, as aforesaid) sets the maximum driving field at 2000 volts R.M.S. per centimeter of ceramic thickness, according to the manufacturer.

It is known to the art that the acoustic power delivered by any ultrasonic system is given by:

$$P = \frac{R_c \omega^2 \xi_m^2}{2S} \quad (1)$$

where $R_c$=characteristic impedance; $\xi_m$=maximum particle velocity; and $S$=standing wave ratio. The strain associated with this amplitude $\xi_m$ can be derived simply from the wave equation $$\xi = \xi_m e^{j(\omega t - kx)} \quad (2)$$

where $\xi$ is now the particle motion with respect to both time and space:

$e = 2.7183$
$\omega = 2\pi f$
$k = \omega/c$
$c$ = sound velocity
$t$ = time
$j = \sqrt{-1}$
$x$ = distance and differentiation with respect to $x$ yields:

$$\frac{\partial \xi}{\partial x} = -jk\xi_m e^{j(\omega t - kx)} \quad (3)$$

$$\left(\frac{\partial \xi}{\partial x}\right)_{max.} = -jk\xi_m$$

Substituting Equation 3 into Equation 1 gives the acoustic power in terms of the strain $$\frac{\partial \zeta}{\partial x}$$

Thus:

$$P = \frac{R_c C^2}{2S} \left(\frac{\partial \zeta}{\partial x}\right)^2_{max.} \quad (4)$$

In Equation 4 $R_c = A\rho C$ for PZT-4; $\rho = 7.5$ gm./cm.$^3$; and $C = 3960$ meters/sec.

Furthermore, although the value of S is not known precisely, elastic standing wave measurements (SWR) made during welding of a number of materials have shown this to vary from 1.4 to 5 and generally to fall in the range of 3 to 4. Thus if we assume a value of 3.5 we can find the area required in terms of the acoustic power output P in ergs per second.

$$\frac{P}{A} = \frac{\rho c^3}{2S} \left(\frac{\partial \zeta}{\partial x}\right)^2_{max.} = 6.11 \times 10^8 \text{ gm./sec.}^3$$

For example in designing a 4200 watt, 15 kc. unit and assuming a conversion efficiency of 60%:

$$P = 2520 \text{ watts} = 2.52 \times 10^{10} \text{ ergs/sec.}$$

hence, $A = 41$ cm.$^2$

At 3 watts per cc. per kc. a total volume of 93 cm.³ of ceramic is required, thus the required thickness of ceramic is approximately 2.3 centimeters or almost 1-inch. Thus each element was selected to be 0.5-inch thick.

The ceramic transducers designed to date have been in accordance with the above theory and have performed well. The cooling system which has evolved during development has proven to be adequate and it has not been necessary to compromise by reducing crystal thickness to facilitate heat removal. The transducer designs tabulated in this report cover a wide range of power capabilities and frequencies and it may be necessary to make minor modifications as our experience with these units increases. However, these tabulations are based on the latest data available from the ceramics manufacturer and our own experience, and should provide satisfactory systems.

As noted above, the transducer assembly of the present invention is connected to an appropriate power supply. Such a power supply, in a typical example is capable of producing electrical signals in the range of between about 60 cycles per second and about 300,000 cycles per second. This frequency range is suitable for purposes of the present invention, including as it does frequencies in both the audible range (such as up to about 15,000 cycles per second) and the ultrasonic range (generally above about 15,000 cycles per second). A preferred frequency would be in the range of from about 3,000 to about 75,000 cycles per second with the optimum being between about 14,000 to about 60,000 cycles per second. Normally, a frequency is chosen which will provide a suitable size of apparatus for a given application or set of applications, with the ultrasonic range having the further advantage of inaudibility for operator comfort. As is well known to the art, the electrical frequency of a conventional alternating current power supply, for example (such as 60 cycles per second) is changed to match the mechanical or elastic vibratory frequency of the apparatus (15,000 cycles per second in the above examples).

While emphasis has been placed on operating the transducer assembly of the present invention at high powers and at the maximum power capability it will be appreciated that reduced and lower power operation is entirely practical, usually by simple operator adjustment of power supply dials, where its use is desired in relatively low power applications.

While the present invention, in its various embodiments, has been described in connection with the utilization of transducer elements made of PZT-4 (a member of the lead-zirconate-titanate family) it will be appreciated that other piezoelectric or electrostrictive materials may be used, although PPT-4 is presently preferred for its superior characteristics, as aforesaid.

As a guide in dimensioning the space washer (22, 22a or 22b), it may be noted that for electrical reasons the washer should have an O.D. not less than and preferably slightly larger than the O.O. of the transducer elements, with an I.D. not less than and preferably somewhat smaller than the I.D. of the transducer elements.

As to the power for the ceramic transducers, those skilled in the art will appreciate that the power source incorporates the necessary circuit elements in the output circuit to tune out the high capacitance associated with ceramic transducers.

While the transducer assembly of the present invention does not require the use of adhesives for joining various components of the assembly, it may be desirable to avoid the possible deleterious effect on acoustical and/or electrical operation of the assembly of minute air gaps at interfaces, by use of a very thin coating of material such as epoxy resin applied to mutually facing surfaces brought into engagement, such resin preferably containing an electrically conductive metal powder, such as silver, to fill any surface voids or irregularities and to maintain continuous electrical contact across each interface. Even such thin coatings may, however, require increased torque to be applied to obtain the desired pre-compression load, but the transducer assembly of the present invention is able to accommodate such adjustment successfully.

The present invention may be embodied in other specific forms without departing from the spirit or essential attributes thereof and, accordingly, reference should be made to the appended claims, rather than the foregoing detailed description in determining the scope of the present invention.

What is claimed:

1. A transducer assembly comprising first and second metal members having parallel end faces in spaced and mutually facing relationship, a first annular ceramic transducer element between said end faces and juxtaposed to the end face of said first member, a second annular ceramic transducer element between said end faces and juxtaposed to the end face on said second member, a spacer between said elements, a resonant sleeve encompassing the mutually facing end faces of said first and second members, adjustable means coupling said sleeve to at least one of said first and second members so that relative movement between said sleeve and one member biases said one member toward the other member to compress the transducer elements therebetween.

2. An assembly in accordance with claim 1 wherein said sleeve has a length of approximately one-half wave length according to the material from which it is made at the operating frequency, and said first member has a length extending beyond one end of said sleeve for a distance corresponding to one-half wave length according to the material from which it is made at the operating frequency.

3. An assembly in accordance with claim 1 wherein said spacer is a circular metal element, and having means for cooling said spacer.

4. An assembly in accordance with claim 1 wherein each end face of said first and second members has an area at least as large as the area of the juxtaposed face of its associated transducer element.

5. A transducer assembly comprising first and second metal members having parallel end faces, first and second ceramic transducers disposed between said end faces, a metal spacer between said transducers, means for coupling an electrical potential to one of said members, means for coupling an electrical potential to said spacer, means for cooling said spacer, a resonant sleeve surrounding said transducers, one end of said sleeve being coupled to said first member by thread means, the other end of said sleeve being coupled to said second member, whereby said first and second coupling sections may be biased towards each other by rotation of said thread means.

6. An assembly in accordance with claim 5 wherein one of said members extends in an axial direction beyond the thread means thereon for a distance corresponding to one-half wave length according to the material from which it is made and at the operating frequency.

7. An assembly in accordance with claim 5 including a tubular insulation member surrounding said transducers and spaced radially inwardly from said sleeve, said insulation member being made from an electrically nonconductive material, the axial length of said insulation member being greater than the combined thickness of said transducers and said spacer.

8. An assembly in accordance with claim 5 wherein said means for cooling said spacer includes a circumferential array of radially extending passageways in said spacer.

9. An assembly in accordance with claim 5 wherein said sleeve has a length of one-half wave length according to the material from which it is made at the operating frequency, and each of said members extends in an axial direction beyond said sleeve for a distance corresponding to one-half wavelength according to the material from which it is made at the operating frequency.

10. A transducer assembly comprising first and second metal members, parallel end faces on said members, first and second lead zirconate titanate transducers disposed between said end faces, a metal spacer between said transducers a tubular insulation element surrounding said transducers and made from an electrically nonconductive material, means for coupling electrical power to said spacer and one of said members, means for cooling said spacer, a sleeve surrounding said insulation element, said sleeve being coupled to said first member with left-hand threads, said second sleeve being coupled to said second member with right-hand threads, said transducers being held in a state of compression by said members consequent upon rotation of said sleeve relative to said members in one rotational direction.

11. A transducer assembly comprising a plurality of annular ceramic transducer elements, an annular spacer element between adjacent transducer elements, said element being serially arranged so that their annularity is with respect to a common axis and defines a cavity interiorly thereof; first and second axially extending members compressing said elements between them, each of said members having inner and outer planar end faces disposed normal to said axis and having external screw threads formed thereon between said inner and outer end faces; each of said elements having planar faces on opposite sides thereof disposed normal to said axis; a coupling sleeve connected to said members, said sleeve being provided with internal screw threads at opposite end portions thereof, right-hand threads at one end portion and left-hand threads at the other end portion cooperating with the threads of the respective members; a passageway extending to said cavity for conveying coolant; said members and said coupling sleeve being made of low hysteresis material, the axial distance between the opposite-hand threads of said coupling sleeve being equal to whole number multiples of one-half wavelength in the material from which it is made at the operating frequency, the axial distance in each member between its external threads and its outer end face being equal to whole number multiples of one-half wavelength in the material from which it is made at the operating frequency, and the axial distance in each member between its external threads and its inner end face being substantially equal to one-quarter wavelength according to the material from which it is made at the operating frequency.

12. A transducer assembly comprising first and second metal members having parallel end faces in spaced and mutually facing relationship, a first annular ceramic transducer element between said end faces and electrically coupled to the end face of said first member, a second annular ceramic transducer element between said end faces and electrically coupled to the end face on said second member, a flat spacer between said elements, means for introducing a fluid through the passage formed by the inside diameter of said elements to said spacer, means extending in an axial direction along the outer periphery of said elements for retaining said members in assembled relationship biasing said elements in compression therebetween, means for coupling an electrical potential to one of said members and said spacer, and the area of said end faces being at least as large as the juxtaposed face of the transducer elements.

13. An assembly in accordance with claim 12 wherein said retaining means includes a resonant sleeve coupled to said first member by adjustable means, and said sleeve having a shoulder against which a portion of said second member is biased.

14. An assembly in accordance with claim 12 wherein the combined length of said members, spacer and elements is an odd whole number multiple of one-half wavelength according to the material of said members at the desired operating frequency.

15. An assembly in accordance with claim 12 wherein said elements are polarized in the thickness mode and are coated on major faces with an electrically conductive material.

16. An assembly in accordance with claim 13 wherein said electrical coupling means in part extends through one of said members and is adapted to be coupled to an A.C. source.

17. A transducer assembly comprising first and second metal members having parallel end faces in spaced and mutually facing relationship, a first annular ceramic transducer element between said end faces and electrically coupled to the end face of said first member, a second annular ceramic transducer element between said end faces and electrically coupled to the end face of said second member, a flat metal spacer between said elements, means retaining said members in assembled relationship biasing said elements in compression therebetween, means for coupling an electrical potential to said spacer, the area of said end faces being at least as large as the juxtaposed face of the transducer elements, said retaining means includes a hollow metal sleeve surrounding said elements and members, a shoulder on the inner surface of said sleeve, a portion of said second member being in abutting contact with said shoulder, and thread means associated with said first member and sleeve for selectively moving said first member toward said second member, said sleeve having a length corresponding to an even whole number of one-quarter wavelengths according to the material from which it is made at the desired operating frequency.

18. An assembly in accordance with claim 17 wherein said shoulder and threads on said sleeve are at antinode regions on said sleeve.

19. A transducer assembly comprising first and second resonant members having juxtaposed end faces which are parallel, first and second annular ceramic transducer elements having a coating of an electrical conductor on flat faces, one face of said first element being electrically coupled to an end face on said first member, one face of said second element being electrically coupled to an end face of said second member, a flat spacer non-magnetic metal having good thermal conductivity, said spacer being between said elements and electrically coupled to the remaining faces of said elements, the diameter of said washer and end faces on the members being at least as great as the diameter of the elements, a sleeve surrounding said elements and coupled to each member, the cross sectional area of the sleeve being not greater than the cross sectional area of one of said members, and said elements being compressed in an axial direction by said members, said elements being resonant in a thickness mode, and means for coupling an electrical potential to said spacer and for grounding one of said members.

20. An assembly in accordance with claim 19 including an adhesive means joining said spacer to said elements, and a powder of electrically conductive material in said adhesive.

References Cited by the Examiner

UNITED STATES PATENTS 3,183,378    4/1965    McCracken et al. _____ 310—8.7

MILTON O. HIRSHFIELD, *Primary Examiner.*

ORIS L. RADER, *Examiner.*

A. J. ROSSI, *Assistant Examiner.*